Aug. 16, 1966 N. C. JACKSON 3,266,190
WEATHER STRIP STRUCTURES
Filed June 17, 1963

INVENTOR.
NORMAN C. JACKSON
BY
Meyer, Baldwin, Doran & Egan
ATTORNEYS

United States Patent Office 3,266,190
Patented August 16, 1966

3,266,190
WEATHER STRIP STRUCTURES
Norman C. Jackson, Sheffield Lake Village, Ohio, assignor to The Standard Products Company, Cleveland, Ohio, a corporation of Ohio
Filed June 17, 1963, Ser. No. 288,169
4 Claims. (Cl. 49—489)

This invention relates to weather strip structures, and although structures embodying the present invention are capable of use in various places for various sealing or weather-stripping purposes, they are particularly suitable for use with aluminum windows and doors for the sealing or weather-stripping of small clearance openings.

The invention has for its primary object the provision of weather strip structures which are characterized by their structural simplicity, the economy of their manufacture, the ease of their assembly with the parts by which they are to be carried or on which they are to be mounted in use thereof, and the particularly effective manner in which they perform their sealing or weather-stripping function.

A more specific object of the present invention is the provision of a weather strip structure which is provided at the base thereof with laterally extending edge flanges for the mounting of the weather strip structure in use thereof, such as the mounting of the weather strip structure, by endwise sliding movement thereof, in a channel having undercut side grooves.

A further more specific object of the present invention is the provision of a weather strip structure having an air and water shield or barrier, preferably of strip-like form, disposed along either one or both sides of the longitudinally extending sealing or weather-stripping portion of the weather strip structure. As a result of such shield or barrier, said sealing or weather-stripping portion is effectively re-enforced and the sealing or weather-stripping effect of the weather strip structure is materially increased.

A further more specific object of the present invention is the provision of a weather strip structure in which the sealing or weather-stripping portion thereof consists of a pile-like body projecting from and extending along one face of a backing strip and in which a flexible strip-like film, preferably of a high molecular weight material such as a vinyl resin or a polyester resin, is disposed along either one or both sides of said pile-like body to thereby provide the weather strip structure with either one or two air and water shields or barriers, with consequent increased usefulness, durability and effectiveness of the weather strip structure.

Further objects of the present invention, and certain of its practical advantages, will be referred to in or will be evident from the following description of three embodiments of the invention, as illustrated in the accompanying drawing, in which.

Before the three weather strip structures here illustrated are specifically described, it is to be understood that weather strip structures embodying the present invention may take various other forms. It is also to be understood that the phraseology or terminology herein used is for purposes of description and not of limitation, as the scope of the present invention is denoted by the appended claims.

Figure 1:
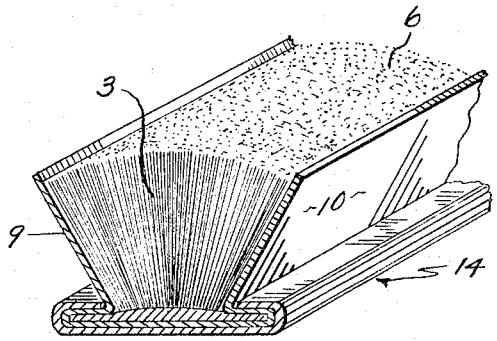
FIG. 1 is a fragmentary perspective view of a weather strip structure embodying one form of the present invention.
Figure 3:
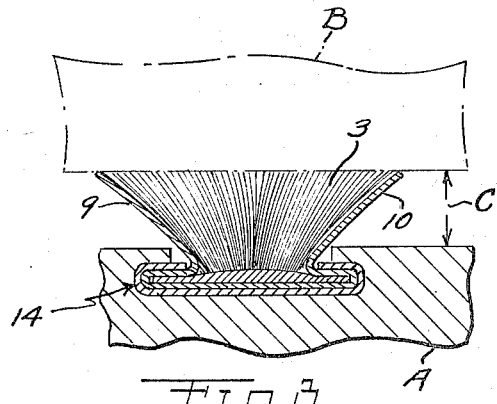
FIG. 3 is a view similar to FIG. 1 but showing the weather strip structure mounted on or assembled with one of two relatively movable parts for sealing or weather-stripping engagement with the other part.
Figure 2:
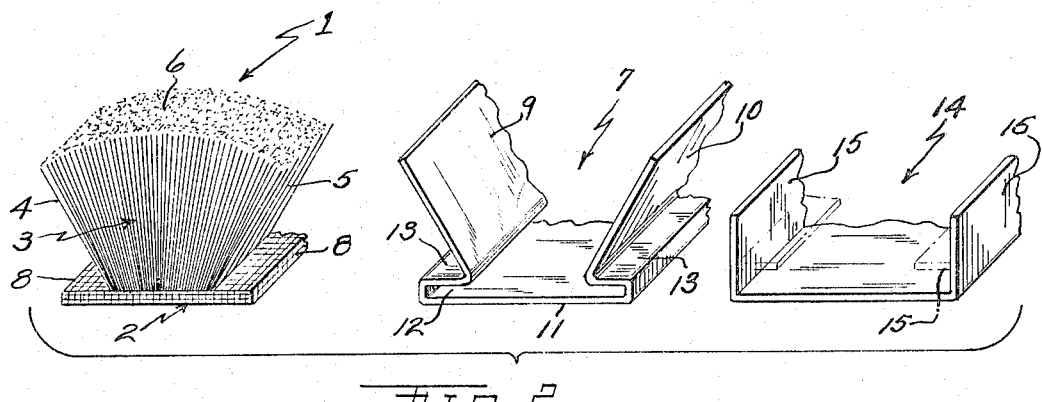
FIG. 2 is a view showing the three parts of the weather strip structure of FIG. 1, the parts being in fragmentary perspective view.

Referring first to the weather strip structure illustrated in FIGS. 1 to 3 for the disclosure of one embodiment of the present invention, it will be noted that such weather strip structure includes a weather strip member generally designated by the reference numeral 1, FIG. 2, and which has a relatively flexible backing portion 2 and a relatively soft and compressible body portion 3 projecting therefrom and extending therealong for sealing or weather-stripping purposes. The backing portion 2 may be of any suitable material, such as woven cloth for example, and of any desired width and length, and the body portion 3 may be, for example, either cut or uncut pile fibers—fibers of cut form being here shown. Obviously, the pile fiber body portion 3 may be of any desired density and of any desired size and shape, it being here shown as one having outwardly diverging side walls 4 and 5 and a transversely convex outer end face 6.

For the mounting of the weather strip structure in use thereof and for the assembly with the pile fiber body portion 3 of the hereinafter described shield or baffle member generally designated by the reference numeral 7 in FIG. 2, the backing portion 2 of the weather strip member 1 has a width greater than that of the pile fiber body portion at the base thereof. As a result, said backing portion projects laterally from said body portion at each side thereof so as to provide an edge flange 8 at each side of said body portion, as best shown in FIG. 2.

Preferably and as here shown, an air and water shield or barrier of flexible form is provided for the pile fiber body portion 3 of the weather strip member 1 at each side of said body portion, although if desired, such a shield or barrier may be provided at only one side of said body portion, as will be readily understood. The present shield or barrier member 7 therefore has two outwardly diverging shield or baffle portions 9 and 10, each of flexible strip-like form, for disposition along the correspondingly diverging side walls 4 and 5 of the pile fiber body portion 3, as shown in FIGS. 1 and 3. If desired, the shield or baffle portions may be of substantially the same height as that of the pile fiber body portion 3 or they may be of somewhat less height or, as here shown, they may be of slightly greater height, this being, of course, a matter of choice.

For economy in the manufacture of the shield or baffle member 7 and to facilitate its assembly with the weather strip member 1, the shield or baffle portions 9 and 10 preferably are integral parts of a one-piece member. As here shown, the shield or baffle member 7 includes a channel-shaped base portion 11 whose chamber 12 is of a width to receive and hold the backing portion 2 of the weather strip member 1 and whose inwardly extending top wall portions 13 are adapted to overlie the edge flanges 8 of said backing portion.

Although the shield or baffle member 7 may be made of various materials, particularly high molecular weight film-forming materials such as vinyl resins and polyester resins, a polyester film of polyethylene terephthlate is preferred. Such a film, commercially available from E. I. du Pont de Nemours & Co. under the trademark "Mylar," is characterized by its outstanding strength and durability, its water repellant nature and its inherent thermal stability, and the ability of the film to retain a preformed or preset shape, such as that shown in FIG. 2.

The film can have, of course, any desired thickness, one suitable thickness being of the order of three thousandths of an inch which enables the film to have the desired flexibility and yet retain its preformed or preset shape.

To maintain in assembled relationship the weather strip member 1 and the shield or baffle member 7, with the backing portion 2 of the weather strip member disposed within the chamber 12 of the channel-shaped base portion of said shield or baffle member, and to provide the weather strip structure with a base of increased strength and durability, a channel-shaped member 14 is here utilized. Although said member 14 may be made of any desired material and of any desired thickness, it preferably is made of sheet metal, such as aluminum, with a thickness, for example, of the order of ten thousandths of an inch.

As shown, the channel-shaped member 14 is of a width to receive the channel-shaped portion 11 of the shield or baffle member 7, which in turn receives, as heretofore mentioned, the backing portion 2 of the weather strip member 1, and the upper portions 15 of the side walls of member 14 are bent inwardly to clampingly overlie the top wall portions 13 of the shield or baffle member 7. As a result, the edge flanges 8 of the backing portion 2 of the weather strip member 1 and the channel-shaped sides of the channel-shaped portion 11 of the shield or baffle member 7 are firmly clamped within member 14.

It thus will be evident that the weather strip structure constituting the embodiment of the invention illustrated in FIGS. 1 to 3 comprises three simple and inexpensive parts (1, 7 and 14) which may be readily assembled for the formation of said weather strip structure—a structure in which an air and water shield or baffle film of strip-like form is provided along each side of the pile fiber body portion 3 of the weather strip structure, with the consequent protection and strengthening of said pile fiber body portion and the provision of a weather strip structure whose air and water sealing ability is quite outstanding.

Figures 4, 5:
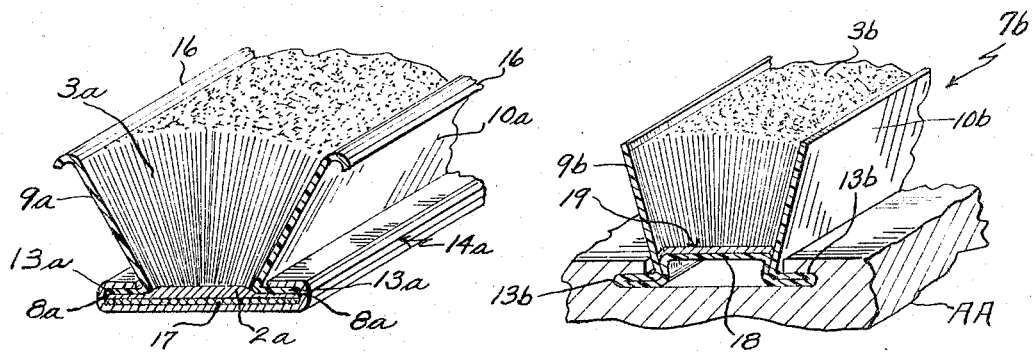
FIG. 4 is a view similar to FIG. 1 but showing another form of weather strip structure embodying the present invention.
FIG. 5 is a view generally corresponding to FIG. 3 but showing still another form of weather strip structure embodying the present invention.

With respect to the weather strip structure constituting the embodiment of the invention illustrated in FIG. 4, it differs from the weather strip structure of FIGS. 1 to 3 in that the shields or baffles 9a and 10a for the sides of the pile fiber body portion 3a are separate members and in that their free longitudinal edge portions are outwardly curled, as at 16. However, as will be readily understood, such edge portions of said shield or baffle members 9a and 10a may be of straight form, as in the first described embodiment of the invention, or of any other desired form.

As in the weather strip structure of FIGS. 1 to 3, the shields or baffles 9a and 10a of the weather strip structure of FIG. 4 are provided at their lower edges with laterally extending flanges 13a which overlie the edge flanges 8a of the backing portion 2a, and are firmly held in such overlying relationship by a channel-shaped base member 14a identical with member 14 of the weather strip structure of FIGS. 1 to 3.

In a weather strip structure in which the sealing or weather-stripping body is carried by a backing portion of woven fabric or the like, such as the backing portion 2 of FIGS. 1 to 3 and the backing portion 2a of FIG. 4, the bottom surface of such backing portion may have applied thereto, if desired, a suitable coating, such as a coating of a polyester resin, to thereby strengthen and somewhat stiffen such backing portion. Such a coating is shown at 17 in the weather strip structure of FIG. 4 and although it may be used whenever desired, it is particularly useful if the weather strip structure contains no sheet metal base member, such as the member 14 of FIGS. 1 to 3 and the member 14a of FIG. 4.

As will be readily understood, the backing portion 2 of the weather strip member 1 of the weather strip structure of FIGS. 1 to 3 may be adhesively secured within the chamber 12 of the channel-shaped base portion 11 of the shield or baffle member 7, wtih the sheet metal channel member 14 of such weather strip structure being used or not, as desired. Similarly, the flanges 13a of the shields or baffles 9a and 10a of the weather strip structure of FIG. 4 may be adhesively secured to the edge flanges 8a of the backing portion 2a, with the sheet metal channel member 14a of such weather strip structure being used or not, as desired.

With respect to the weather strip structure constituting the embodiment of the invention illustrated in FIG. 5, it will be noted that such structure comprises a one piece shield or baffle member 7b having a raised or elevated and longitudinally extending base portion 18 which is adhesively coated, as at 19, for the application thereto, by a suitable flocking operation, of a mass of fibers to provide the weather strip structure with an elongated sealing or weather-stripping portion 3b. As in the embodiment of the invention illustrated in FIGS. 1 to 3, the shield or baffle member 7b of the weather strip structure of FIG. 5 has shield or baffle portions 9b and 10b disposed along the sides of the fiber body 3b, and the shield or baffle member 7b also is provided at the base thereof with laterally extending flanges 13b—flanges which are provided for the mounting of the weather strip structure in use thereof, such as in the groove of part AA. As will be noted, in the weather strip structure of FIG. 5, there is no sheet metal base member, such as the member 14 of FIGS. 1 to 3 or the member 14a of FIG. 4.

As will be readily understood, in the weather strip structure of FIG. 5, the base portion 18 of the shield or baffle member 7b to which the flock fibers are applied need not be raised or elevated, but to do so reduces, of course, the length of the flock fibers and thus the cost thereof.

As will be evident from FIG. 3, a weather strip structure embodying the present invention may be readily assembled with and carried by one of two relatively movable parts, such as the part A of parts A and B—for the sealing or weather-stripping of the clearance opening C between such parts, by providing part A with a channel having undercut side grooves, into which the base of the weather strip structure may be endwise slid and frictionally retained, all as will be readily understood.

To those skilled in the art to which the present invention relates, further features and advantages of weather strip structures embodying the present invention will be evident from the foregoing description of three such embodiments.

What I claim is:

1. A weather strip structure, comprising a weather strip member having an elongated and generally flat backing portion and a body portion projecting from and extending along one face of said backing portion for cooperative weatherstripping engagement with an associated structure, said backing portion extending laterally beyond said body portion at each side thereof to provide edge flanges on opposite sides of said body portion, an elongated barrier member of sheet material having a channel-shaped base portion containing the backing portion of the weather strip member and having inturned walls overlying the edge flanges of said backing member, said barrier member also having barrier flanges extending from the inturned walls of its channel-shaped base portion and lying along the sides of the body portion of the weather strip member for engagement with said associated structure, and a channel-shaped sheet metal member containing the channel-shaped portion of said barrier member and the backing portion of said weather strip member and having inturned walls overlying the inturned walls of said barrier member to maintain said barrier member and said weather strip member in assembled relation.

2. A weather strip structure, comprising a weather strip member having an elongated and generally flat backing portion and a body portion of pile fibers projecting from and extending along one face of said backing portion for cooperative weatherstripping engagement with an associated structure, said backing portion extending laterally beyond said body portion at each side thereof to provide edge flanges on opposite sides of said body portion, and a separate elongated one-piece barrier member of flexible foam retaining resin film material having a channel-shaped base portion retainably receiving the backing portion of the weather strip member and having inturned walls overlying the edge flanges of said backing portion, said barrier member also having barrier flanges extending from the inturned walls of its channel-shaped base portion and being at least substantially as high as the pile fibers and lying along both sides of the pile fibers of the weather strip member for engagement with said associated structure.

3. A weather strip structure, comprising an elongated one-piece film member having a base provided with a raised, longitudinally extending central portion and with edge portions on opposite sides of said raised central portion, said film member also having inturned walls overlying said edge portions of said base, a body of pile fibers adhesively secured to the upper surface of said raised central portion and projecting upwardly therealong for weather-stripping purposes, said film member also having a barrier flange extending upwardly from each inturned wall, said barrier flanges extending along opposite sides of said body of pile fibers.

4. A weather strip structure, comprising an elongated one-piece barrier member of flexible form-retaining resin film material and having a base and inturned edge walls overlying the edge portions of said base, and an elongated body of pile fibers adhesively secured to said base between said inturned edge walls for cooperative weatherstripping engagement with an associated structure, said barrier member also having barrier flanges extending from the inner edges of said inturned edge walls and being at least substantially as high as said pile fibers and lying along both sides of said pile fibers for engagement with said associated structure.

References Cited by the Examiner

UNITED STATES PATENTS

| | | | |
|---|---|---|---|
| 955,897 | 4/1910 | Noe | 15—399 |
| 2,004,722 | 6/1935 | Hamm | 20—69 |
| 2,065,078 | 12/1936 | Lane | 20—69 |
| 2,117,174 | 5/1938 | Jones | 15—110 |
| 2,129,082 | 9/1938 | Bryer. | |
| 2,191,549 | 2/1940 | Spraragen. | |
| 2,223,459 | 12/1940 | Reid. | |
| 2,321,924 | 6/1943 | Mancini | 20—69 |
| 2,599,183 | 6/1952 | Kessler | 20—69 |
| 2,799,063 | 7/1957 | Miller | 20—69 |
| 2,931,434 | 4/1960 | Steel. | |
| 2,946,072 | 7/1960 | Filler et al. | 15—110 |

FOREIGN PATENTS

| | | |
|---|---|---|
| 827,800 | 2/1960 | Great Britain. |

HARRISON R. MOSELEY, *Primary Examiner.*

REINALDO P. MACHADO, *Examiner.*

W. E. HEATON, *Assistant Examiner.*